(12) United States Patent
Voigt et al.

(10) Patent No.: US 11,187,562 B2
(45) Date of Patent: Nov. 30, 2021

(54) HOUSING FOR A FLOW MEASURING DEVICE, AND A FLOW MEASURING DEVICE HAVING SUCH A HOUSING

(71) Applicant: Endress+Hauser Flowtec AG, Reinach (CH)

(72) Inventors: Frank Voigt, Weil am Rhein (DE); Steffen Ziegler, Schopfheim (DE); Roland Huber, Basel (CH)

(73) Assignee: Endress+Hauser Flowtec AG, Reinach (CH)

( * ) Notice: Subject to any disclaimer, the term of this patent is extended or adjusted under 35 U.S.C. 154(b) by 70 days.

(21) Appl. No.: 16/471,222

(22) PCT Filed: Nov. 22, 2017

(86) PCT No.: PCT/EP2017/080054
§ 371 (c)(1),
(2) Date: Jun. 19, 2019

(87) PCT Pub. No.: WO2018/114188
PCT Pub. Date: Jun. 28, 2018

(65) Prior Publication Data
US 2020/0088556 A1 Mar. 19, 2020

(30) Foreign Application Priority Data
Dec. 20, 2016 (DE) .................. 10 2016 124 975.0

(51) Int. Cl.
*G01F 1/58* (2006.01)
*G01F 15/14* (2006.01)
*G01F 15/18* (2006.01)

(52) U.S. Cl.
CPC .............. *G01F 1/588* (2013.01); *G01F 15/14* (2013.01); *G01F 15/185* (2013.01)

(58) Field of Classification Search
None
See application file for complete search history.

(56) References Cited

U.S. PATENT DOCUMENTS 4,614,113 A * 9/1986 Daghe ................... G01F 15/185
137/454.2
4,881,413 A 11/1989 Georgi et al.
(Continued)

FOREIGN PATENT DOCUMENTS

| CN | 102959364 A | 3/2013 |
|---|---|---|
| CN | 102971608 A | 3/2013 |

(Continued)

*Primary Examiner* — Harshad R Patel
(74) *Attorney, Agent, or Firm* — Kelly J. Smith; Endress+Hauser (USA) Holding Inc.

(57) ABSTRACT

The present disclosure relates to a housing for a flow measuring device and a flow measuring device. The housing includes a housing body having a housing wall and a housing chamber, where the housing wall has a first wall element and a second wall element. The first wall element and the second wall element enclose the housing chamber, and the housing chamber is configured to receive a measuring tube. The housing wall has first and second openings configured to support the measuring tube at first and second measuring tube ends. The first wall element has a first leaf and a second leaf, and the second wall element has a third leaf and a fourth leaf, where the first leaf and the second leaf and also the third leaf and the fourth leaf engage flush in one another.

13 Claims, 5 Drawing Sheets

(56) References Cited

U.S. PATENT DOCUMENTS

| | | | | |
|---|---|---|---|---|
| 5,182,952 A * | 2/1993 | Pyzik | ................ | G01F 1/06 |
| | | | | 73/861.79 |
| 5,450,758 A * | 9/1995 | Smoll | ................ | G01F 1/60 |
| | | | | 73/861.12 |
| 7,971,494 B2 * | 7/2011 | Hussain | ................ | G01F 1/8413 |
| | | | | 73/861.355 |
| 9,255,825 B1 | 2/2016 | Smith et al. | | |
| 2008/0150750 A1 * | 6/2008 | Parris | ................ | G07F 15/10 |
| | | | | 340/870.02 |
| 2017/0023388 A1 * | 1/2017 | Doornebosch | ................ | G01F 15/185 |

FOREIGN PATENT DOCUMENTS

| | | |
|---|---|---|
| CN | 103998900 A | 8/2014 |
| DE | 3545155 A1 | 7/1986 |
| DE | 102006020265 A1 | 10/2007 |
| DE | 102013102544 A1 | 9/2014 |
| DE | 102014104107 A1 | 10/2014 |
| EP | 2713145 A1 | 4/2014 |

\* cited by examiner

HOUSING FOR A FLOW MEASURING DEVICE, AND A FLOW MEASURING DEVICE HAVING SUCH A HOUSING

CROSS-REFERENCE TO RELATED APPLICATIONS

The present application is related to and claims the priority benefit of German Patent Application No. 10 2016 124 975.0, filed on Dec. 20, 2016 and International Patent Application No. PCT/EP2017/080054 filed on Nov. 22, 2017, the entire contents of which are incorporated herein by reference.

TECHNICAL FIELD

The invention relates to a housing for a flow measuring device for measuring the mass flow or volumetric flow of a medium in a measuring tube. The invention further relates to a flow measuring device having such a housing.

BACKGROUND

Housings of flow measuring devices have a wall which comprises a housing chamber, wherein electronic components of the flow measuring device are accommodated in the housing chamber in order to protect them from harmful influences. The production of such housings may comprise several production steps, depending upon the design, and can therefore be very complicated. DE102013102544A1 shows a magneto-inductive flow measuring device, wherein a housing is produced from an outer tube and two side panes, wherein the side panes are configured for guiding the measuring tube, which measuring tube is centrally supported by the side panes. The manufacture of a housing of a magneto-inductive flow measuring device from at least three wall components is complex, and the central support of the measuring tube reduces the stability of the measuring tube with respect to the housing.

SUMMARY

The aim of the invention is therefore to propose a housing and a flow measuring device with a housing that avoid the aforementioned disadvantages.

A housing according to the invention for a flow measuring device comprises:

a housing body having a housing wall and a housing chamber, wherein the housing wall has a first wall element and a second wall element, wherein the housing chamber is formed by the first wall element and the second wall element, wherein the housing chamber is configured to receive the measuring tube, wherein the housing wall has a first opening and a second opening, which openings are configured to support the measuring tube at a first measuring tube end and at a second measuring tube end, wherein the first wall element has a first leaf and a second leaf, and wherein the second wall element has a third leaf and a fourth leaf, wherein the first leaf and the second leaf, as well as the third leaf and fourth leaf, terminate flush with one another, wherein the first leaf has the first opening, and wherein the second leaf has the second opening.

In one embodiment of the housing, a folded-up first wall element has a first axis with minimal moment of inertia, and a folded-up second wall element has a second axis with minimal moment of inertia, wherein the first axis and the second axis are perpendicular or parallel to one another.

In one embodiment of the housing, the first wall element and the second wall element are made from a sheet material, in particular a sheet metal.

In one embodiment of the housing, at least one threaded sleeve is inserted into the housing wall in the region of the first opening and the second opening respectively, wherein the threaded sleeve is configured to respectively make a process connection attachable to the first measuring tube end and to the second measuring tube end, wherein the threaded sleeves are preferably inserted into the first wall element.

In one embodiment of the housing, a spacer is arranged between the first leaf and the second leaf, said spacer being configured to maintain the distance between the first leaf and the second leaf.

In one embodiment of the housing, the housing has a plug-in connector that is configured to connect an electronic circuit sub-assembly which is insertable or inserted in the housing to an electronic circuit sub-assembly outside of the housing, wherein the plug-in connector is preferably inserted into the first wall element.

In one embodiment of the housing, the housing has a casting opening which is configured to enable a casting compound to be introduced into the housing chamber, wherein the casting opening can be sealed tight, wherein the casting opening is preferably inserted into the first wall element.

In one embodiment of the housing, the first leaf and the second leaf define a plane extending through the leaves, which plane is perpendicular to the leaves, and wherein the first leaf and the second leaf each have two notches opposite one another with respect to the plane.

In one embodiment of the housing, the third leaf and the fourth leaf each have a trough, which trough connects in each case two regions of the second wall element that are in contact with a notch.

In one embodiment of the housing, the first wall element has a greater wall thickness than the second wall element.

In one embodiment of the housing, the first wall element and the second wall element are joined by laser welding.

A flow measuring device according to the invention for measuring the mass flow or volumetric flow of a medium in a measuring tube comprises:

a housing according to the invention;

a measuring tube for guiding the medium;

a sensor module for detecting a measurand and for providing measurand-dependent signals, wherein the sensor module is arranged in the housing chamber;

wherein the measuring tube is arranged in the housing chamber.

In one embodiment of the flow measuring device, the housing has a measuring/operating electronics module, which measuring/operating electronics module is arranged on a spacer, wherein the measuring/operating electronics module is configured to operate the sensor module.

In one embodiment of the flow measuring device, the housing is at least partially filled by a casting compound.

In one embodiment of the flow measuring device, the flow measuring device is a magneto-inductive flow measuring device, wherein the sensor module has a magnet system for generating a magnetic field, wherein the magnetic field is perpendicular to a measuring tube axis, and wherein the sensor module has two measuring electrodes for tapping a voltage in the medium, which voltage is, to a good approximation, proportional to the strength of the magnetic field and to the flow rate of the medium.

In one embodiment of the flow measuring device, the flow measuring device is a thermal mass flow measuring device, a Coriolis flow measuring device, or a vortex flow measuring device.

BRIEF DESCRIPTION OF THE DRAWING

The invention will now be described with reference to exemplary embodiments.

DETAILED DESCRIPTION

Figure 1:
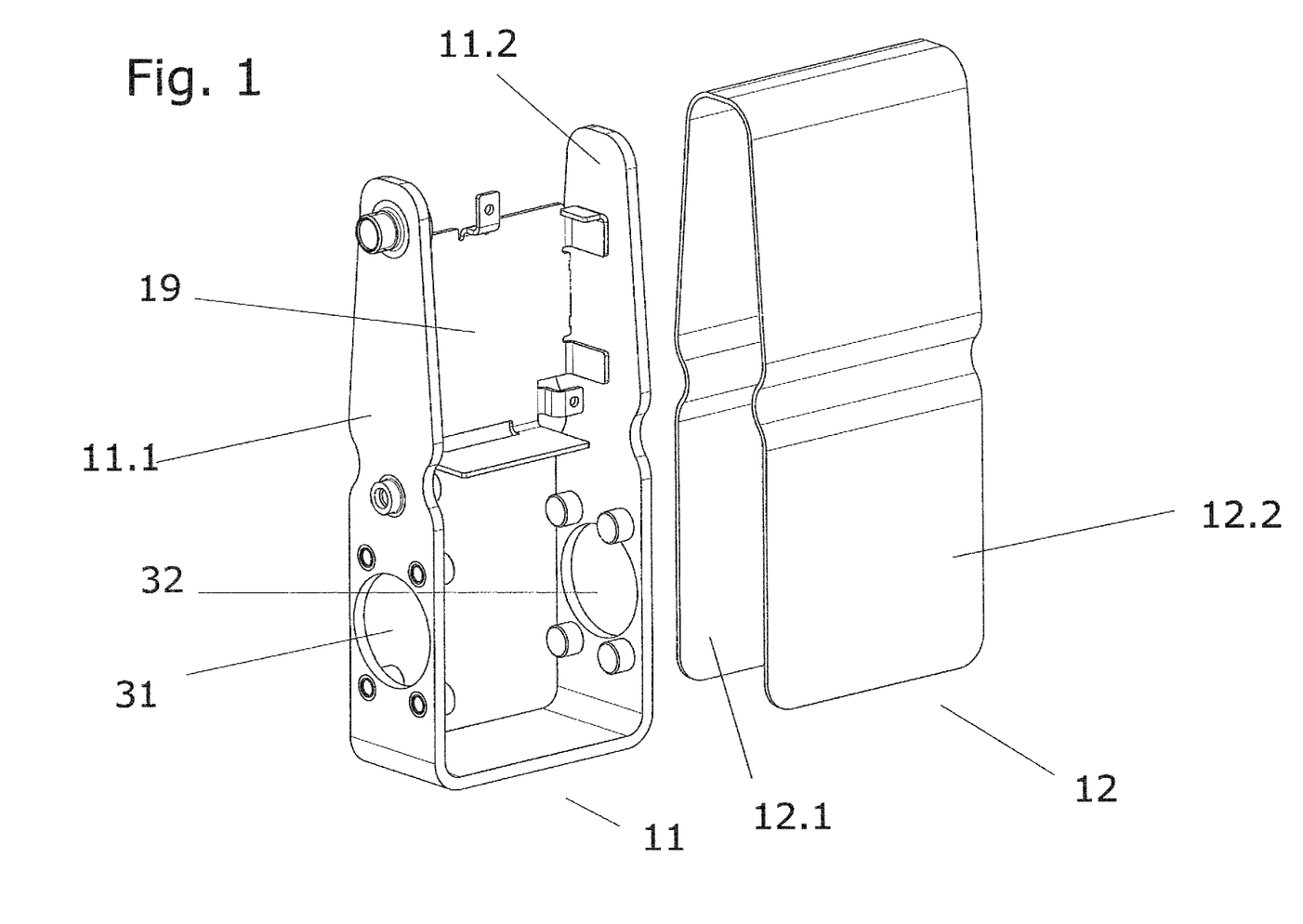
FIG. 1 shows a view of two wall elements of a housing according to the present disclosure.

FIG. 1 shows a first wall element 11 and a second wall element 12, which wall elements can be assembled into a housing according to the invention, wherein the first wall element 11 has a first leaf 11.1 and a second leaf 11.2, and wherein the second wall element 12 has a third leaf 12.1 and a fourth leaf 12.2. The first leaf has a first opening 31, and the second leaf has a second opening 32. The first leaf 11.1 and the second leaf 11.2 of the first wall element 11 are firmly spaced apart by a spacer 19. By bringing together the wall elements so that the wall elements terminate flush with one another, a housing can be produced with a housing chamber, wherein the housing chamber is formed by the wall elements.

Figure 2:
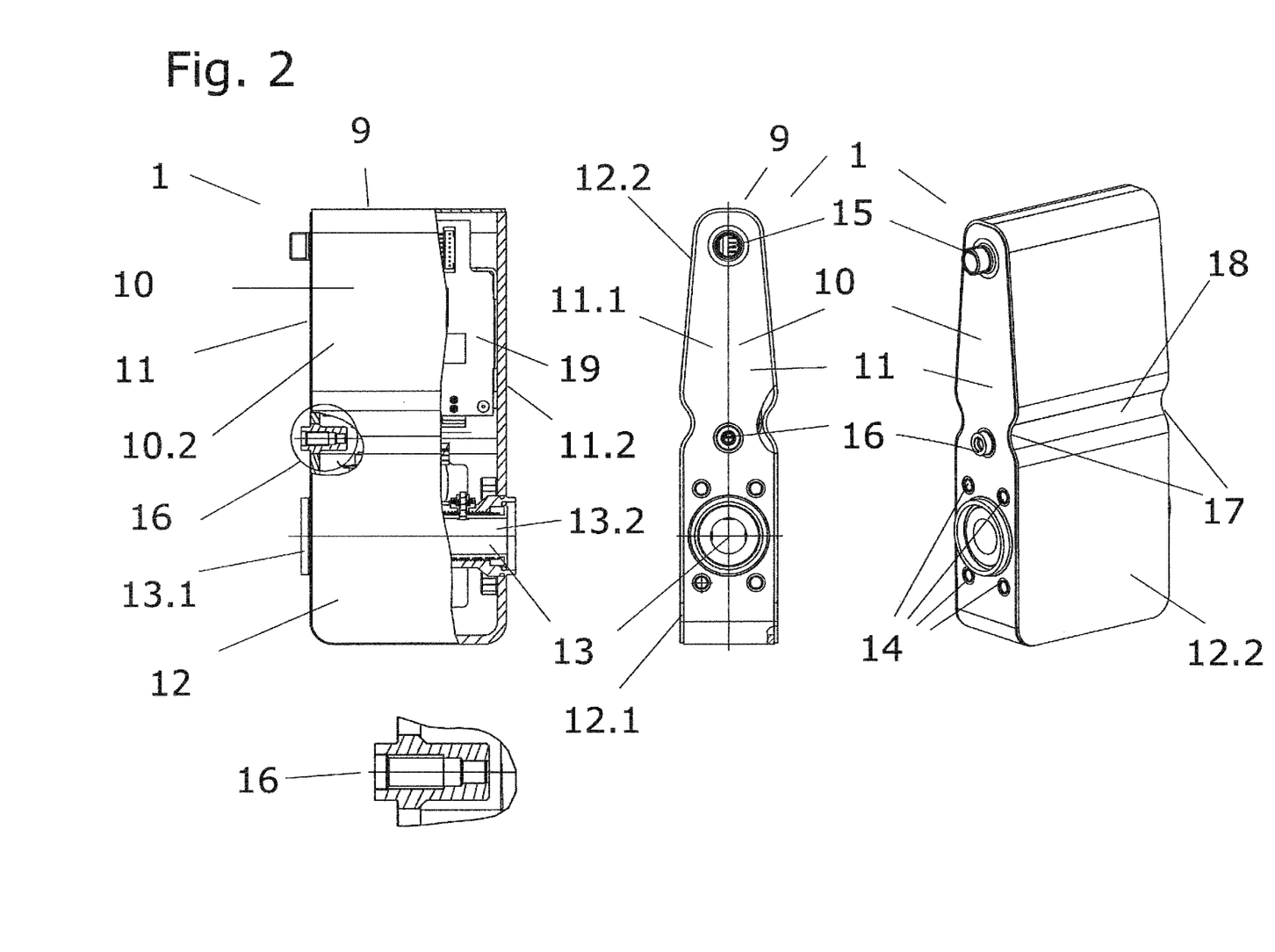
FIG. 2 shows views of a flow measuring device with a housing according to the present disclosure.

FIG. 2 shows a flow measuring device 1 with a housing 9 according to the invention with wall elements according to FIG. 1, wherein FIG. 2 shows a side view with a detail, a front view, and an oblique view of the flow measuring device 1. The housing has a housing wall 10 with a first wall element 11 and a second wall element 12. The first wall element 11 has a first leaf 11.1 and a second leaf 11.2, the second wall element 12 has a third leaf 12.1 and a fourth leaf 12.2, wherein the first wall element 11 and the second wall element 12 engage flush in one another and surround a housing chamber. The housing chamber comprises two regions defined by two opposing troughs 18 in the second wall element 12. The troughs 18 enable a secure gripping of the flow measuring device 1, which avoids damage due to accidental dropping. A first region has a measuring tube 13 with a first measuring tube end 13.1 and a second measuring tube end 13.2, wherein the measuring tube is held at the first measuring tube end and at the second measuring tube end by the first leaf 11.1 of the first wall element 11 or by the second leaf 11.2 of the first wall element, wherein the first measuring tube end is guided through the first opening 31 in the first leaf, and wherein the second measuring tube end is guided through the second opening 32 in the second leaf. In the region of the first opening and in the region of the second opening, threaded sleeves 14 are admitted into the first wall element, which threaded sleeves are configured to each make a process connection attachable to the first measuring tube end and to the second measuring tube end.

The first wall element 11.1 has, in the second region, a plug-in connector 15 which is admitted into the first leaf, wherein the plug-in connector 15 is configured to connect an electronic circuit sub-assembly which can be inserted in the housing to an electronic circuit sub-assembly outside of the housing 9. Preferably, a sensor module for detecting a measurand and for providing measurand-dependent signals is arranged in the first region, wherein the sensor module, e.g., in a magneto-inductive flow measuring device, has a magnet system for generating a magnetic field in a medium flowing through the measuring tube 13 and at least one pair of measuring electrodes for tapping a flow-dependent voltage induced in the medium by the magnetic field. Preferably, a measuring/operating electronics module for operating the sensor module is provided in the second region, wherein a measuring/operating electronics module is preferably arranged on a spacer 19, which spacer 19 is configured to maintain a distance between the first leaf 11.1 and the second leaf 11.2. The first wall element 11.1 has a casting opening 16 in a region of notches 17 that is configured to enable the introduction of a casting compound into the housing chamber, wherein the casting opening can be sealed tight. The casting compound serves to thermally decouple the measuring/operating electronics module from the sensor module in order to enable a continuous operation of the flow measuring device.

Figure 3:
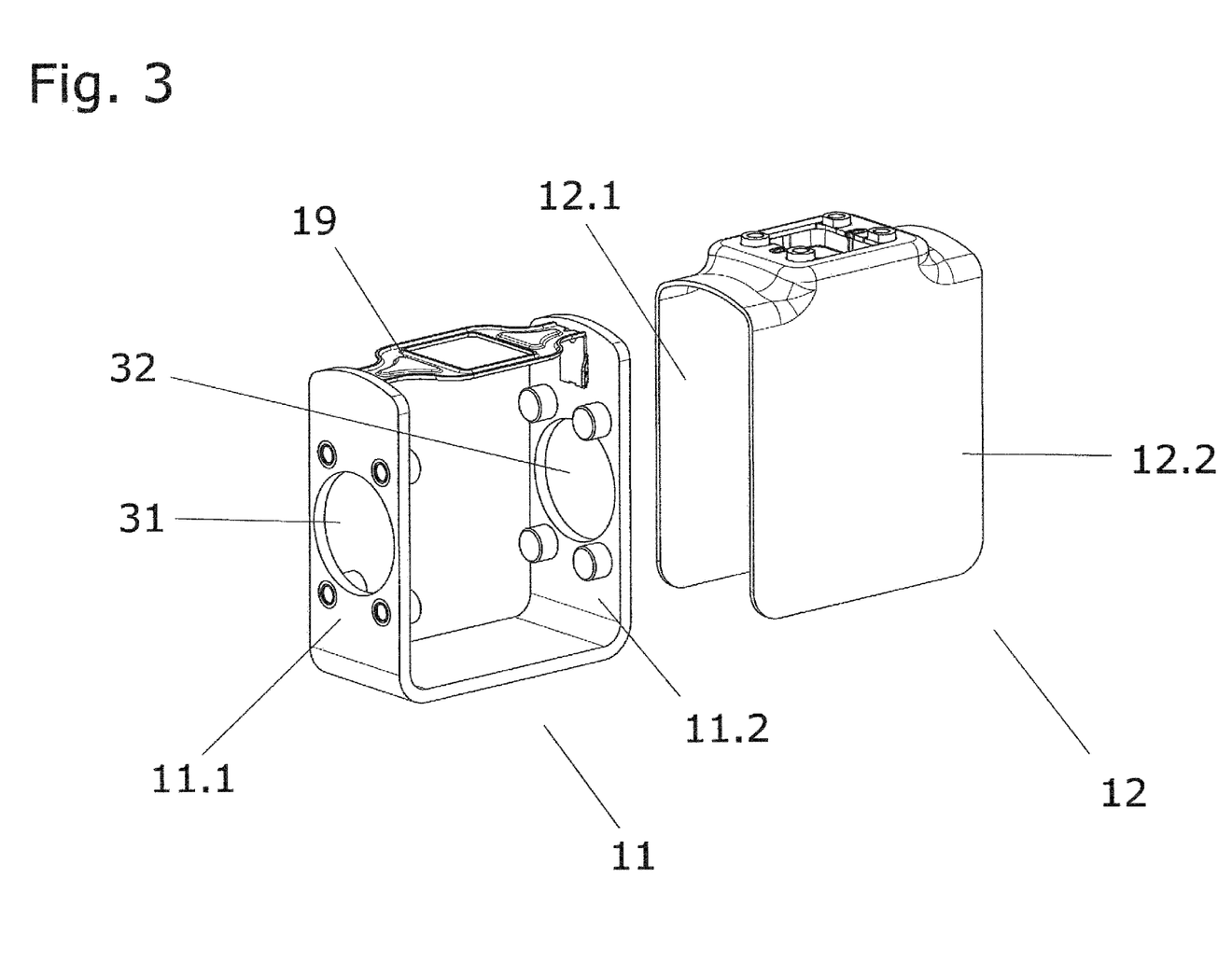
FIG. 3 shows a view of two wall elements of a housing according to the present disclosure.

FIG. 3 shows a first wall element 11 and a second wall element 12, which wall elements can be assembled into a housing according to the invention, wherein the first wall element 11 has a first leaf 11.1 and a second leaf 11.2, and wherein the second wall element 12 has a third leaf 12.1 and a fourth leaf 12.2. The first leaf has a first opening 31, and the second leaf has a second opening 32. The first leaf 11.1 and the second leaf 11.2 of the first wall element 11 are firmly spaced apart by a spacer 19. By bringing together the wall elements so that the wall elements terminate flush with one another, a housing can be produced with a housing chamber, wherein the housing chamber is formed by the wall elements.

Figure 4:
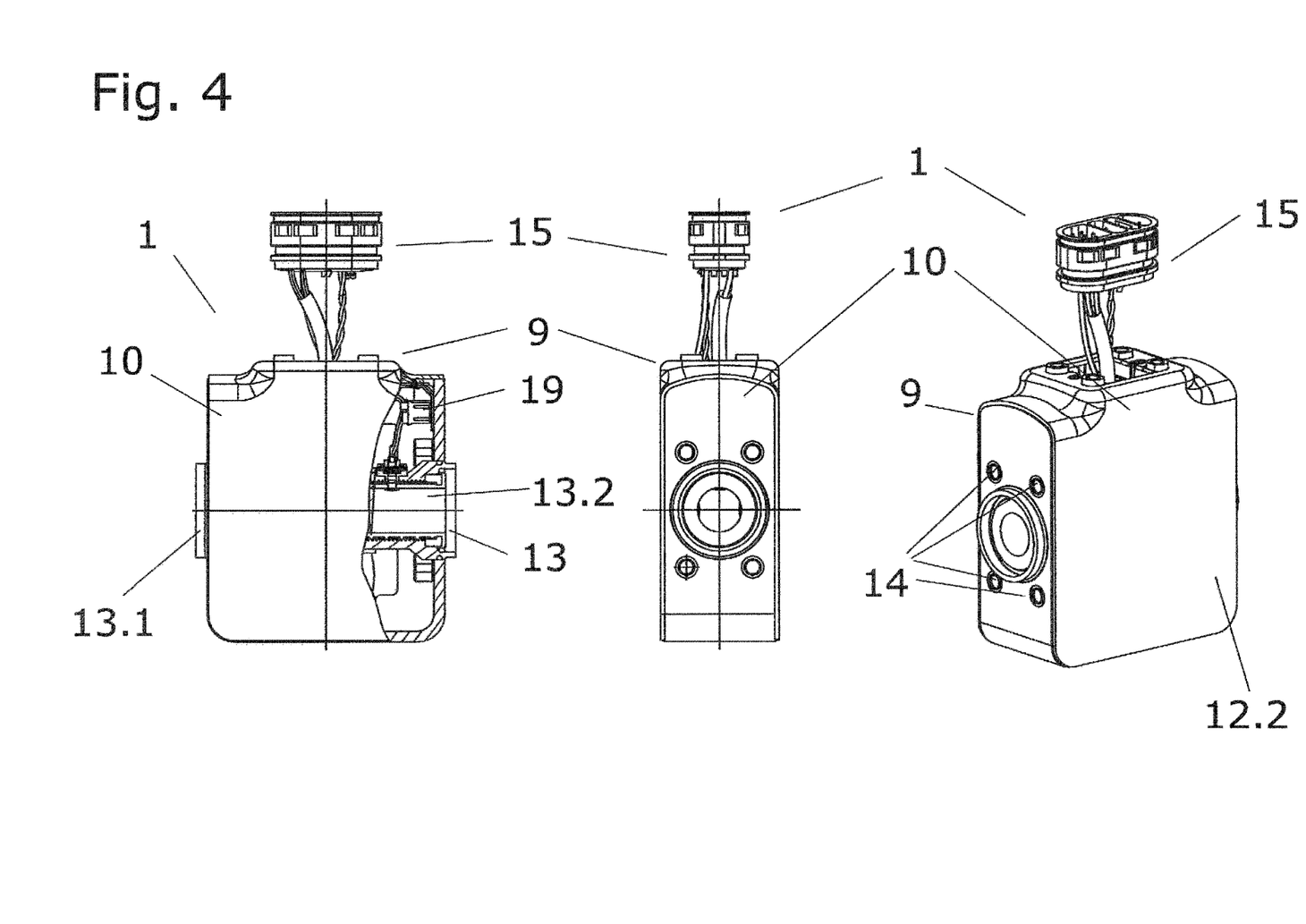
FIG. 4 shows views of a further flow measuring device with a further housing according to the present disclosure.

FIG. 4 shows a flow measuring device 1 with a housing 9 according to the invention having wall elements according to FIG. 3, wherein FIG. 4 shows a side view with a detail, a front view, and an oblique view of the flow measuring device 1. The housing has a housing wall 10 with a first wall element 11 and a second wall element 12. The first wall element 11 has a first leaf 11.1 and a second leaf 11.2, and the second wall element 12 has a third leaf 12.1 and a fourth leaf 12.2, wherein the first wall element 11 and the second wall element 12 engage flush in one another and surround a housing chamber. The housing chamber has a measuring tube 13 with a first measuring tube end 13.1 and a second measuring tube end 13.2, wherein the measuring tube is held at the first measuring tube end and at the second measuring tube end by the first leaf 11.1 of the first wall element 11 or by the second leaf 11.2 of the first wall element, wherein the first measuring tube end is guided through the first opening 31 in the first leaf, and wherein the second measuring tube end is guided through the second opening 32 in the second leaf. In the region of the first opening and in the region of the second opening, threaded sleeves 14 are admitted into the first wall element, which threaded sleeves are configured to each make a process connection attachable to the first measuring tube end and to the second measuring tube end. The first wall element 11.1 has a plug-in connector 15, which is admissible into the second wall element, wherein the plug-in connector 15 is configured to connect an electronic circuit sub-assembly which can be inserted in the housing to an electronic circuit sub-assembly outside of the housing 9. Preferably, a sensor module for detecting a measurand and for providing measurand-dependent signals is arranged in the housing chamber, wherein the sensor module, e.g., in a magneto-inductive flow measuring device, has a magnet system for generating a magnetic field in a medium flowing through the measuring tube 13 and has at least one pair of measuring electrodes for tapping a flow-dependent voltage induced in the medium by the magnetic field. A measurement/operating electronics module for operating the sensor module is connected to the sensor module via the plug-in connector 15.

In the wall elements of flow measuring devices 1 shown in FIGS. 1 through 4, the first wall element 11 and the second wall element 12 are made of a sheet material, in particular of a sheet metal, wherein the first wall element 11 has a greater wall thickness than the second wall element. The wall thickness of the second wall element is less than 5 mm, and preferably less than 3 mm. The wall thickness of the second wall element is greater than 1 mm. The wall thickness of the first wall element is less than 8 mm, and preferably less than 5 mm. The wall thickness of the first wall element is greater than 2 mm, and, in particular, greater than 3 mm. Preferably, the second wall element is pushed over the first wall element during manufacture and, after production of a flush contact, is pressed against the first wall element, so that the wall elements can be integrally joined to each other by a laser welding process.

Figure 5:
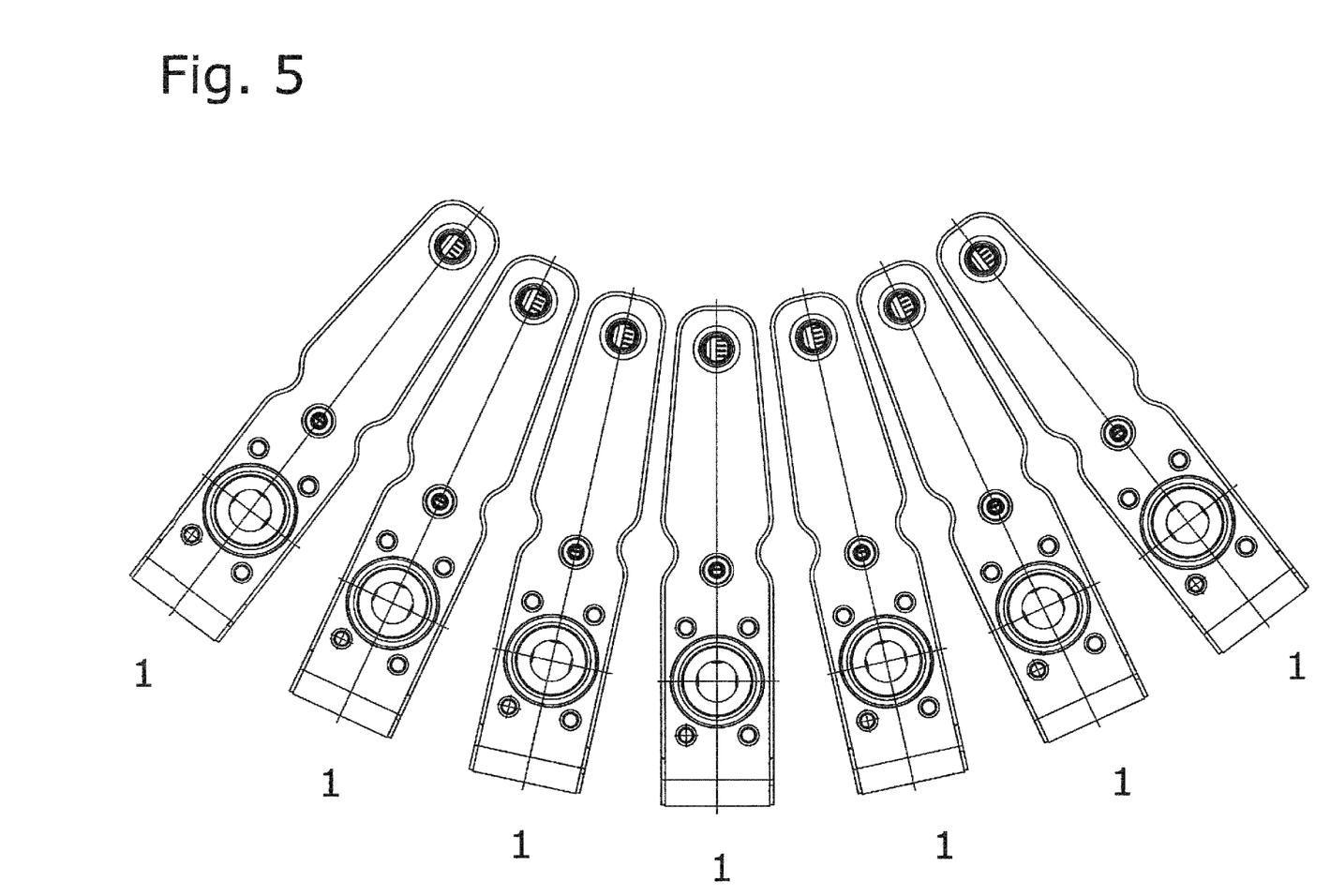
FIG. 5 shows a possible arrangement of several flow measuring devices 1 with housings according to the present disclosure, e.g., in a filling plant.

FIG. 5 shows several flow measuring devices 1 according to FIG. 2, which flow measuring devices form a section of a filling carousel of a filling plant. The partially wedge-shaped profile of the flow measuring devices makes it possible to set the flow measuring devices 1 closely adjacent to each other so that, due to the advantageous wedge shape of the flow measuring devices, a complete filling carousel can accommodate more flow measuring devices than a filling carousel with flow measuring devices without a partially wedge-shaped profile.

The invention claimed is:

1. A housing for a flow measuring device for measuring mass flow or volumetric flow of a medium in a measuring tube, including:
a housing body having a housing wall and a housing chamber;
wherein the housing wall has a first wall element and a second wall element, wherein the housing chamber is formed by the first wall element and the second wall element;
wherein the housing chamber is configured to receive the measuring tube, wherein the housing wall has a first opening and a second opening, wherein the first opening and the second opening are configured to support the measuring tube at a first measuring tube end and at a second measuring tube end;
wherein the first wall element has a first leaf and a second leaf, wherein the second wall element has a third leaf and a fourth leaf, wherein the first leaf and the second leaf and the third leaf and the fourth leaf terminate flush with one another;
wherein the first leaf includes the first opening, and wherein the second leaf includes the second opening;
wherein the first wall element and the second wall element are produced from a sheet material;
wherein the first wall element and the second wall element terminate flush with one another.

2. The housing of claim 1, wherein at least one threaded sleeve is inserted into the housing wall in the region of each of the first opening and the second opening;
wherein the threaded sleeves are configured to each make a process connection attachable to the first measuring tube end and to the second measuring tube end;
wherein the threaded sleeves are inserted into the first wall element.

3. The housing of claim 1, wherein a spacer is arranged between the first leaf and the second leaf, said spacer being configured to maintain the distance between the first leaf and the second leaf.

4. The housing of claim 1, wherein the housing has a plug-in connector configured to connect an electronic circuit sub-assembly insertable in the housing to another electronic circuit sub-assembly outside of the housing, wherein the plug-in connector is inserted into the first wall element.

5. The housing of claim 1, wherein the housing has a casting opening configured to enable a casting compound to be introduced into the housing chamber, wherein the casting opening can be sealed tight, wherein the casting opening is inserted into the first wall element.

6. The housing of claim 1, wherein the first leaf and the second leaf define a plane extending through the first and second leaves which is perpendicular to the first and second leaves, and wherein the first leaf and the second leaf each have two notches facing one another with respect to the plane.

7. The housing of claim 6, wherein the third leaf and the fourth leaf each have a trough, wherein each trough connects two portions of the second wall element that are in contact with the notches.

8. The housing of claim 1, wherein the first wall element has a greater wall thickness than the second wall element.

9. The housing of claim 1, wherein the first wall element and the second wall element are joined by laser welding.

10. A flow measuring device for measuring mass flow or volumetric flow of a medium in a measuring tube, comprising:
a housing including:
a housing body having a housing wall and a housing chamber;
wherein the housing wall has a first wall element and a second wall element, wherein the housing chamber is formed by the first wall element and the second wall element;
wherein the housing chamber is configured to receive the measuring tube, wherein the housing wall has a first opening and a second opening, wherein the first opening and the second opening are configured to support the measuring tube at a first measuring tube end and at a second measuring tube end;
wherein the first wall element has a first leaf and a second leaf, wherein the second wall element has a third leaf and a fourth leaf, wherein the first leaf and the second leaf and the third leaf and the fourth leaf terminate flush with one another;
wherein the first leaf includes the first opening, and wherein the second leaf includes the second opening;
a measuring tube for guiding the medium;
a sensor module for detecting a measurand and providing measurand-dependent signals, wherein the sensor module is arranged in the housing chamber;
wherein the measuring tube is arranged in the housing chamber;
wherein the first wall element and the second wall element are produced from a sheet material;

wherein the first wall element and the second wall element terminate flush with one another.

11. The flow measuring device of claim 10, wherein the housing has an electronics module, wherein the electronics module is arranged on a spacer, wherein the electronics module is configured to operate the sensor module.

12. The flow measuring device of claim 10, wherein the housing is at least partially filled by a casting compound.

13. The flow measuring device of claim 10, wherein the flow measuring device is a magneto-inductive flow measuring device;
- wherein the sensor module includes a magnet system for generating a magnetic field;
- wherein the magnetic field is perpendicular to a measuring tube axis;
- wherein the sensor module has two measuring electrodes for tapping a voltage in the medium, wherein the voltage is proportional to a strength of the magnetic field and to a flow rate of the medium.

* * * * *